(No Model.)  2 Sheets—Sheet 1.

E. E. WHIPPLE.
HARROW.

No. 571,715.  Patented Nov. 17, 1896.

Witnesses:
E. C. Duffy
Geo. N. Werle

Inventor:
E. E. Whipple
per O. E. Duffy
Attorney (No Model.) 2 Sheets—Sheet 2.
E. E. WHIPPLE.
HARROW.
No. 571,715. Patented Nov. 17, 1896.
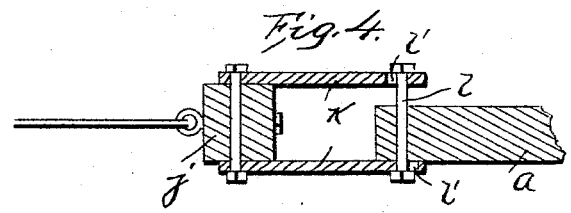
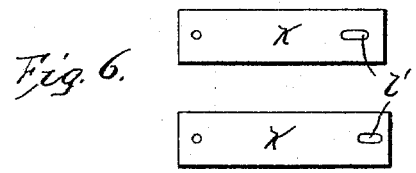
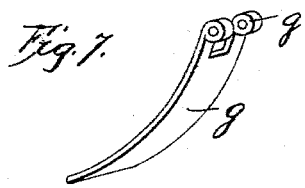
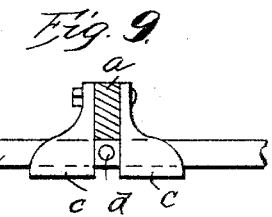
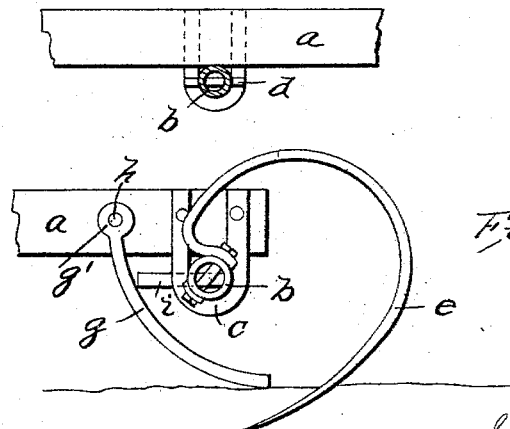
Witnesses: E. C. Duffy, Chas. M. Wesle
Inventor: E. E. Whipple per O. E. Duffy, Attorney

UNITED STATES PATENT OFFICE.

EFFINGER E. WHIPPLE, OF ST. JOHNS, MICHIGAN.

HARROW.

SPECIFICATION forming part of Letters Patent No. 571,715, dated November 17, 1896.

Application filed October 13, 1894. Serial No. 525,814. (No model.)

*To all whom it may concern:*

Be it known that I, EFFINGER E. WHIPPLE, of St. Johns, in the county of Clinton and State of Michigan, have invented certain new and useful Improvements in Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in harrows.

The object of the invention is to provide an improved harrow, exceedingly strong and durable in construction, and having rocking or adjustable teeth controlling shoes so that when the teeth are raised the shoes will be forced down to permit ready transportation of the harrow and when the teeth are adjusted for cultivating the shoes will swing up and not interfere with the free use of the teeth.

A further object of the invention is to provide an improved coupling or evener for several harrow-sections, connecting the harrow-sections and having a lateral and upward play, but held against dropping to the ground, so that in turning the evener is held from the ground and does not drag.

A further object of the invention is to improve certain details in construction and arrangements of parts, whereby a highly efficient and improved harrow is produced.

The invention consists in certain novel features of construction and in combinations of parts, more fully described and particularly pointed out hereinafter.

Figure 1:
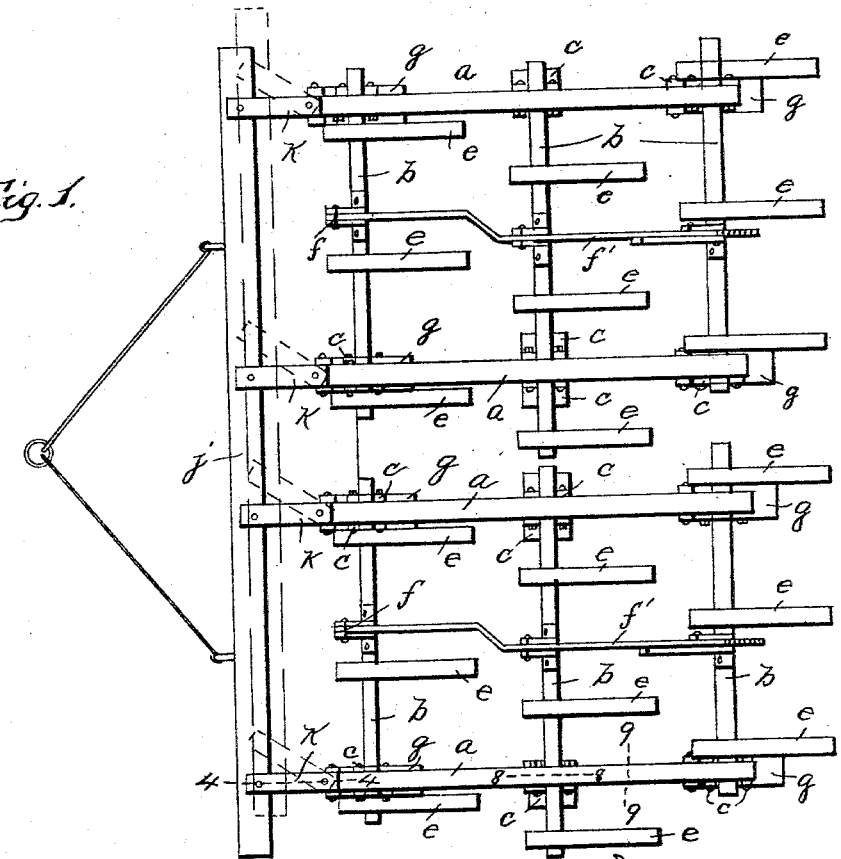
Figure 2:
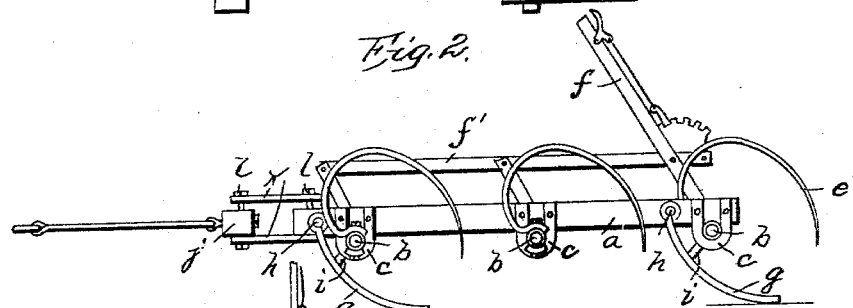
Figure 3:
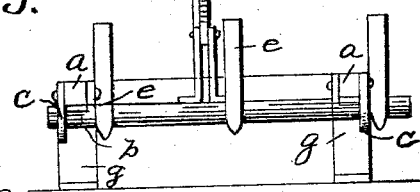

Referring to the accompanying drawings, Figure 1 is a top plan of two harrow-sections and an evener. Fig. 2 is a side view of the same. Fig. 3 is a rear view of one of the sections. Fig. 4 is a section on the line 4 4, Fig. 1. Fig. 5 is a detail elevation showing a tooth working and shoe raised. Fig. 6 is a detail plan of the two links connecting the evener and the front end of a harrow-frame beam. Fig. 7 is a detail perspective of one of the shoes. Fig. 8 is a section on the lines 8 8, Fig. 2. Fig. 9 is a detail view of the end portion of the center rockable tooth-beam.

In the drawings, $a$ $a$ are the two parallel bars of the harrow-frame extending in the line of draft. The rocking tooth-beams $b$ are journaled to these bars of the frame and extend transversely across the same and usually project beyond the same. Three rockable tooth-beams are here shown, although I do not limit myself to any specific number or arrangement of such beams. The tooth-beams are arranged at the under edges of the frame-bars and are confined and journaled thereto by the U-shaped straps or clamps $c$, embracing the tooth-beams and at their upper ends secured to the sides of the frame-bar. The center tooth-beam has two clamps embracing it at each end, as shown in Fig. 8, and each end of the center beam has the radial pins $d$ (see Fig. 9) between said clamps or straps, thereby preventing longitudinal movement of the beam and also bracing and strengthening the frame. The front and rear tooth-beams are usually confined to the frame-bars by a U-shaped strap at each end, although I do not limit myself to any specific arrangement.

$e$ are the curved spring harrow-teeth clamped on the rockable tooth-beams, which are preferably round in cross-section and formed of gas-pipe. These teeth are usually so arranged as not to track, but so as to cover as much ground as possible as thoroughly as can be.

Suitable means is provided to rock the tooth-beams and lock them in the desired position. The usual means for this purpose can be employed, viz., upright arms from the center and front beams, the hand-lever $f$ from the rear beam being provided with a spring-pawl, and the bar $f'$, pivoted to the arms and lever, having a rack for said pawl, so that all the beams are rocked simultaneously or locked together.

The front and rear ends of each harrow-section are provided with shoes $g$. Each shoe preferably consists of a piece of metal curved rearwardly and forked at the upper end to embrace a frame-bar. The upper ends of the legs of the forked ends are formed with transverse eyes $g'$, whereby the shoes are pivoted to the bar by transverse bolts $h$, permitting free vertical movement of the shoes.

The front shoes are pivoted to the front ends of the frame-bars and extend rearwardly beneath the front tooth-beam. The rear shoes are pivoted to the rear portions of the bars just in advance of the rear tooth-beam and extend rearwardly beneath the same.

Opposite each shoe the tooth-beams are provided with projections or pins $i$, so arranged that when the tooth-beams are rocked to lift the teeth from the ground said pins will engage the shoes and force them down, so as to raise the teeth and harrow from the ground, whereby the harrow is ready for transportation and can be moved on said shoes. When the tooth-beams are rocked in the opposite direction to throw the teeth into the ground, the said projections $i$ move up away from the shoes and permit the shoes to swing freely upward and the teeth to enter the earth the desired depth.

$j$ is the evener-bar, to which the draft is attached. The several harrow-sections are attached to this bar, which extends transversely in front of the sections.

The front end of each frame-bar has the two rigid metal links $k$ $k$, pivoted one to its upper surface and the other to its lower surface by a bolt $l$. The links extend forwardly and are pivoted to the evener and fit the upper and lower surfaces thereof. This connection permits a free lateral play of the evener and sections; but the links hold the evener-bar up from the ground, which is a great advantage, particularly when turning, as the ordinary construction of evener drags when the draft is slackened. The inner ends of the links can be so slotted (see $l'$) as to permit the evener-bar to swing up in the line of draft.

It is evident that various slight changes might be made in the forms, constructions, and arrangements of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. The harrow-sections, in combination with the evener-bar $j$ arranged transversely in front of the same, and the several pairs of coupling-links $k$, arranged on the upper and lower faces of the evener and section-frames, vertical pivots pivotally connecting said links to the said frames and evener, said links so slotted at the pivots at $l'$, $l'$, as to hold the evener from dropping to the ground and yet permitting the same to rise and swing laterally to the line of draft.

2. A harrow having frame-bars extending in the line of draft provided with bearings, turnable tooth-beams having harrow-teeth and mounted to turn in said bearings, and provided with means to hold the beams against longitudinal displacement, means, substantially as described, to rock and lock said beams, short shoes pivoted to the frame-bars, and projections from the tooth-beams arranged to force down said shoes when the beams are rocked to raise the teeth, substantially as described.

3. The combination of a harrow-frame, independent swinging supporting-shoes pivoted thereto to swing vertically, turnable tooth-beams carrying teeth and provided with turning and locking means, and projections from the beams arranged to engage and force down said shoes when the beams are turned to raise the teeth, and to move from said shoes and permit them to freely swing up when the beams are turned to force the teeth down, substantially as described.

4. A harrow having swinging supporting-shoes independently pivoted to and depending from the frame-bars, and turnable tooth-beams disconnected from and controlling said shoes so as to force them down when the beams are turned to raise the teeth, and to permit the shoes to freely swing when the beams are turned to force down the teeth, substantially as described.

5. A harrow-frame having the downwardly and rearwardly curved supporting-shoes independent of each other and forked at their upper ends with transverse eyes to receive the pivot-bolts uniting the shoes to the frame, and tooth-bars having teeth, said shoes being controlled by the movement of the tooth-bars, substantially as described.

6. In a harrow, the combination of a frame, turnable tooth-beams mounted therein and provided with teeth, means for controlling the beams, and short supporting-shoes at their upper ends pivotally joined to the frame just in advance of certain beams and from thence extending downwardly and rearwardly beneath said beams and controlled by the movements of the beams so as to be held down to support the machine when the beams are rocked to raise the teeth and to move up when the teeth are thrown into operative digging position, substantially as described.

7. In a harrow, the combination of a frame extending in the line of draft, transverse rockable tooth-beams carried thereby and provided with teeth, the two shoes pivotally joined at their upper ends to the front portions of the frame just in advance of the front tooth-beam and extending downwardly and rearwardly to engage the ground, the two short supporting-shoes at their upper ends pivotally joined to the rear portions of the frame just in advance of the rear tooth-beam, and extending downwardly and rearwardly to support the rear end of the frame, and means for controlling said shoes so that they support the machine when the teeth are raised and swing up when the teeth are thrown down to operative position, substantially as described.

8. In combination, a harrow-frame, turnable tooth-beams carried thereby, and provided with teeth and controlling means, and vertically-movable supporting-shoes confined directly to the frame adjacent to the tooth-beams, and means controlled by the movements of the beams and applied to the shoes between their lower ends and the frame to force the shoes down when the teeth are raised and to permit the shoes to move up when the teeth are down, substantially as described.

9. The combination of a harrow-frame, turnable tooth-beams mounted therein and provided with teeth and controlling-beams, and supporting-shoes pivotally joined at their upper end to the frame just in advance of the beams and from thence extending downwardly and rearwardly beneath the beams, and controlling means from each beam applied to its respective shoes between their pivotal points and rear ends to force down the shoes when the teeth are raised and permit the shoes to swing up when the teeth are lowered, substantially as described.

In testimony that I claim the foregoing as my own I affix my signature in presence of two witnesses.

EFFINGER E. WHIPPLE.

Witnesses:
G. M. PETRIE,
A. K. PETRIE.